US008358763B2

(12) United States Patent
Patel et al.

(10) Patent No.: US 8,358,763 B2
(45) Date of Patent: Jan. 22, 2013

(54) CAMPING ON A CONFERENCE OR TELEPHONY PORT

(75) Inventors: Labhesh Patel, San Francisco, CA (US); Sanjeev Kumar, San Francisco, CA (US); Mukul Jain, San Jose, CA (US); Joseph F. Khouri, San Jose, CA (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1168 days.

(21) Appl. No.: 11/507,915

(22) Filed: Aug. 21, 2006

(65) Prior Publication Data

US 2008/0063174 A1 Mar. 13, 2008

(51) Int. Cl.
*H04M 3/42* (2006.01)

(52) U.S. Cl. ............. 379/202.01; 379/158; 379/203.01; 379/204.01; 379/205.01; 379/209.01

(58) Field of Classification Search ............. 379/209.01, 379/202.01, 205.01, 266.01, 219; 709/204; 370/261, 276

See application file for complete search history.

(56) References Cited

U.S. PATENT DOCUMENTS

| | | |
|---|---|---|
| 5,483,587 A | 1/1996 | Hogan et al. |
| 5,600,366 A | 2/1997 | Schulman |
| 5,673,253 A | 9/1997 | Shaffer |
| 5,729,687 A | 3/1998 | Rothrock et al. |
| 5,917,830 A | 6/1999 | Chen et al. |
| 5,963,217 A | 10/1999 | Grayson et al. |
| 6,044,081 A | 3/2000 | Bell et al. |
| 6,137,834 A | 10/2000 | Wine et al. |
| 6,141,324 A | 10/2000 | Abbott et al. |
| 6,160,881 A * | 12/2000 | Beyda et al. ............. 379/209.01 |
| 6,236,854 B1 | 5/2001 | Bradshaw |
| 6,269,107 B1 | 7/2001 | Jong |
| 6,332,153 B1 | 12/2001 | Cohen |
| 6,501,739 B1 | 12/2002 | Cohen |
| 6,505,169 B1 | 1/2003 | Bhgavath et al. |
| 6,567,505 B1 * | 5/2003 | Omori et al. .................... 379/84 |
| 6,570,926 B1 | 5/2003 | Agrawal et al. |
| 6,608,820 B1 | 8/2003 | Bradshaw |
| 6,624,841 B1 | 9/2003 | Buchner |
| 6,643,298 B1 | 11/2003 | Brunheroto et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |

(Continued)

FOREIGN PATENT DOCUMENTS

EP 1 553 735 A1 7/2005
WO WO2005101857 * 10/2005

*Primary Examiner* — Joseph J Nguyen
(74) *Attorney, Agent, or Firm* — Baker Botts L.L.P.

(57) ABSTRACT

In one embodiment, a scheduling/conferencing system provides a user with the ability to set up a camp-on request for a person invited to attend a conference session in response to one or more selections made by the user via a user interface, which may include a name of the person and a specified action to be taken when the person leaves the conference session. During the conference session, a conference port of the person is camped-on. When the person leaves the conference session and his conference port becomes free, the specified action, which includes an attempt to communicate with the person by the user, is executed. It is emphasized that this abstract is provided to comply with the rules requiring an abstract that will allow a searcher or other reader to quickly ascertain the subject matter of the technical disclosure.

18 Claims, 6 Drawing Sheets

U.S. PATENT DOCUMENTS

| | | | |
|---|---|---|---|
| 6,718,553 B2 | 4/2004 | Kenworthy | |
| 6,735,572 B2 | 5/2004 | Landesmann | |
| 6,744,785 B2 | 6/2004 | Robinett et al. | |
| 6,771,644 B1 | 8/2004 | Brassil et al. | |
| 6,771,657 B1 | 8/2004 | Elstermann | |
| 6,775,247 B1 | 8/2004 | Shaffer et al. | |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,925,068 B1 | 8/2005 | Stanwood et al. | |
| 6,931,001 B2 | 8/2005 | Deng | |
| 6,931,113 B2 | 8/2005 | Ortel | |
| 6,937,569 B1 | 8/2005 | Sarkar et al. | |
| 6,947,417 B2 | 9/2005 | Laursen et al. | |
| 6,956,600 B1 | 10/2005 | Gaylord | |
| 6,956,828 B2 | 10/2005 | Simard et al. | |
| 6,959,075 B2 | 10/2005 | Cutaia et al. | |
| 6,976,055 B1 | 12/2005 | Shaffer et al. | |
| 6,989,856 B2 | 1/2006 | Firestone et al. | |
| 7,003,086 B1 | 2/2006 | Shaffer et al. | |
| 7,007,098 B1 | 2/2006 | Smyth et al. | |
| 7,031,348 B1 | 4/2006 | Gazit | |
| 7,084,898 B1 | 8/2006 | Firestone et al. | |
| 7,127,487 B1 | 10/2006 | Wang et al. | |
| 7,209,763 B2 | 4/2007 | Martin et al. | |
| 7,379,653 B2 | 5/2008 | Yap et al. | |
| 7,660,849 B1 * | 2/2010 | Shaffer et al. | 709/204 |
| 7,742,586 B1 * | 6/2010 | Trandal et al. | 379/201.12 |
| 2001/0000540 A1 | 4/2001 | Cooper et al. | |
| 2002/0004841 A1 | 1/2002 | Sawatari | |
| 2002/0006165 A1 | 1/2002 | Kato | |
| 2002/0052214 A1 | 5/2002 | Maggenti et al. | |
| 2002/0087976 A1 | 7/2002 | Kaplan et al. | |
| 2002/0163918 A1 | 11/2002 | Cline | |
| 2003/0016632 A1 | 1/2003 | Refai et al. | |
| 2003/0025786 A1 | 2/2003 | Norsworthy | |
| 2003/0076850 A1 | 4/2003 | Jason, Jr. | |
| 2003/0198195 A1 | 10/2003 | Li | |
| 2004/0054714 A1 * | 3/2004 | Wuerfel et al. | 709/203 |
| 2004/0057449 A1 | 3/2004 | Black | |
| 2004/0165527 A1 | 8/2004 | Gu et al. | |
| 2004/0165710 A1 | 8/2004 | DelHoyo et al. | |
| 2004/0199659 A1 | 10/2004 | Ishikawa et al. | |
| 2004/0213152 A1 | 10/2004 | Matuoka et al. | |
| 2004/0250201 A1 | 12/2004 | Caspi | |
| 2004/0255328 A1 | 12/2004 | Baldwin et al. | |
| 2005/0069102 A1 | 3/2005 | Chang | |
| 2005/0078171 A1 | 4/2005 | Firestone et al. | |
| 2005/0081244 A1 | 4/2005 | Barett et al. | |
| 2005/0123114 A1 * | 6/2005 | Trandal et al. | 379/201.01 |
| 2005/0138372 A1 | 6/2005 | Kajihara et al. | |
| 2005/0259803 A1 | 11/2005 | Khartabil | |
| 2006/0020995 A1 | 1/2006 | Opie et al. | |
| 2006/0067250 A1 | 3/2006 | Boyer et al. | |
| 2006/0072672 A1 | 4/2006 | Holcomb et al. | |
| 2006/0090166 A1 | 4/2006 | Dhara et al. | |
| 2006/0104458 A1 | 5/2006 | Kenoyer | |
| 2006/0146734 A1 | 7/2006 | Wenger et al. | |
| 2006/0189337 A1 | 8/2006 | Farrill et al. | |
| 2006/0259755 A1 | 11/2006 | Kenoyer | |
| 2007/0110029 A1 | 5/2007 | Gilmore, II et al. | |
| 2007/0123284 A1 | 5/2007 | Schliwa-Bertling et al. | |
| 2007/0133435 A1 | 6/2007 | Eneroth et al. | |
| 2007/0280464 A1 * | 12/2007 | Hughes et al. | 379/205.01 |
| 2008/0043140 A1 | 2/2008 | Herpel et al. | |

* cited by examiner

CAMPING ON A CONFERENCE OR TELEPHONY PORT

TECHNICAL FIELD

This disclosure relates generally to telephony and teleconferencing.

BACKGROUND

Telephony and conferencing systems in which participants communicate in a conference session or meeting over existing voice and data networks, have been in been in existence for many years. Modern conferencing and telephony systems typically include advanced features that enhance user capabilities. For instance, "call waiting" is a well-known feature of telephony systems that notifies a caller when another call is coming in during an active call. "Call parking" is a configurable feature of certain telephony systems that allows the user to deposit a stable call at a specified directory number, then go to another phone and dial the park number to retrieve the call. Similarly, some telephony systems enable a technique known as "camping on" a call, wherein an incoming call is stored on hold until an attendant, trunk, trunk group, or station is available to accept it, at which time the call is completed. Basically, when the current call ends, the system connects the user with the phone whose call was being camped-on.

One important drawback of the existing camp-on approach is that it only applies to calls that are currently in progress. That is, there is presently no way for a person to set up a camp-on for a call that will take place sometime in the future. But situations do arise in which a person wants to speak directly with another person at a future time; for instance, immediately after the other person finishes a scheduled conference call. For example, an employee of a company may need to discuss an urgent matter with his manager. The manager, however, may have a very full schedule that includes numerous conference calls, allowing him little if any available time. Often times, the manager suggests that the employee try to reach him after his participation in a certain teleconference call ends. A manager, for instance, may tell the employee that he has a scheduled one-hour conference call that starts at 11:00 a.m. tomorrow, but expects to get away early, and recommends that the employee catch up with him after the meeting ends. This means that the employee must wait until the scheduled teleconference starts and then frequently walk past or call his manager's office to see if he is still on the phone. Obviously, this approach is inconvenient and results in considerable wasted employee work time for the enterprise.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 6 illustrates an example method of operation for a deferred camp-on.

DESCRIPTION OF EXAMPLE EMBODIMENTS

In the following description specific details are set forth, such as device types, system configurations, device types, communication methods, etc., in order to provide a thorough understanding of the present invention. However, persons having ordinary skill in the relevant arts will appreciate that these specific details may not be needed to practice the present invention.

According to one embodiment of the present invention, a conferencing/telephony system is provided that allows a user to set up a camp-on for a future scheduled conference call (i.e., one that is not currently in progress) via a scheduling server, and also to identify a selected person's port (i.e., the "campee") in a conference or telephony call in order to camp-on to that port. In a specific implementation, the scheduling server or system graphically displays a list of participants invited to a scheduled conference and the user selects one participant from that list on whose conference port he wants to set the camp-on. If the selected person is missing from the list of participants then the user may optionally type in the email address or phone number of that person. Thereafter, the user selects an action that he would like the system to take when the camped-on conference port becomes free. For example, the selected action may be to initiate an outbound call from the user to the selected person's office phone when the conference port becomes free. As a result, time wasted in the enterprise due to employees having to manually check if a campee is done with a teleconference in order to get hold of them is drastically reduced.

Figure 1:
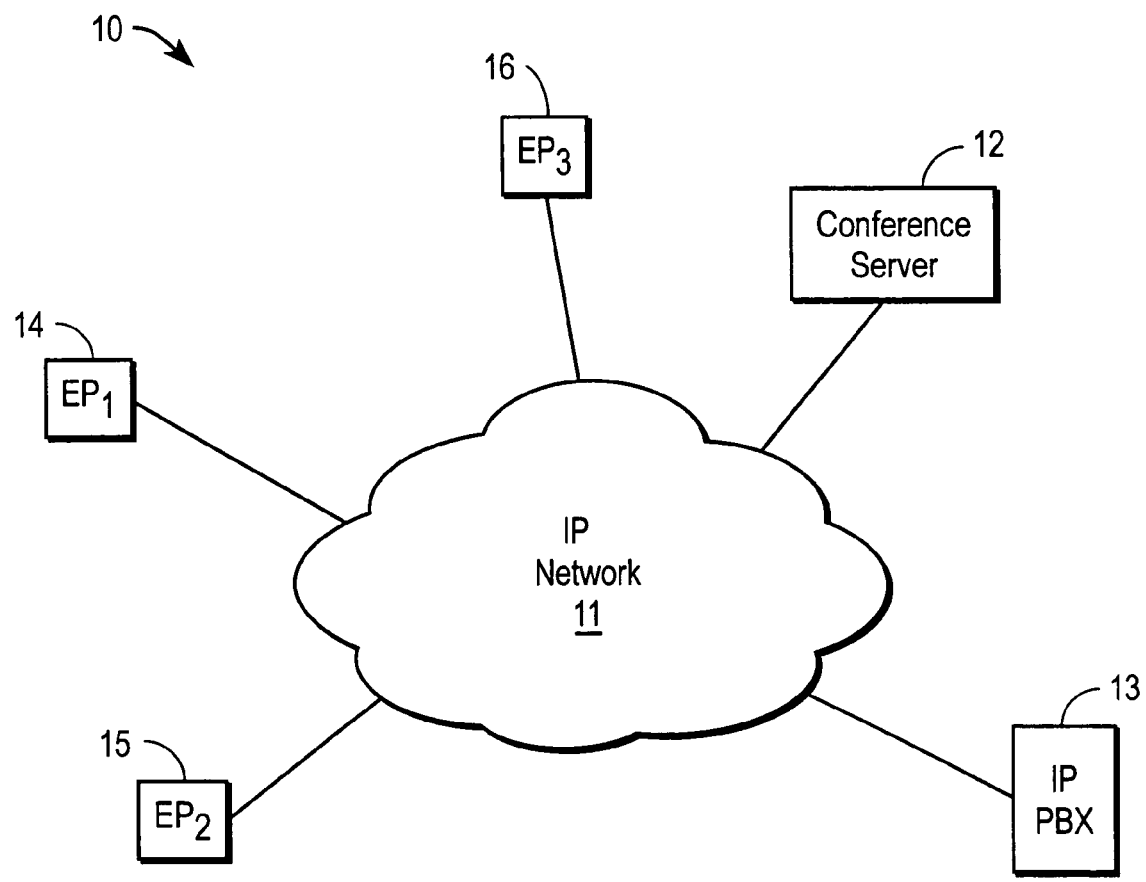
FIG. 1 illustrates an example conferencing and telephony system.

FIG. 1 illustrates an example conferencing and telephony system 10 and a plurality of endpoint devices 14-16 ($EP_1$-$EP_3$) that may be used to connect with conference server 12 and Internet protocol public branch exchange (IP PBX) 13 via IP network 11. It is appreciated that in different specific implementations the media path for the conference participants may include audio/video transmissions, e.g., Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices.

Conference server 12 comprises a conferencing or meeting scheduling system application that includes software (or firmware) plug-ins, modules, or enhancements that implement the various features and functions described herein. In a specific implementation, for example, conferencing server 12 may run a modified or enhanced IP communication system software product such as Cisco's MeetingPlace™ conferencing application that allows users to schedule and attend meeting conferences. Cisco MeetingPlace is typically deployed on a corporate network behind the firewall, and facilitates scheduling of business conferences from a touch-tone or voice over IP (VoIP) telephone, or a computer, using various software clients, such as Microsoft® Outlook, or a web browser. Other enhanced or modified scheduling systems, such as Yahoo® Calendar, may also be used.

In the embodiment shown, conference server 12 includes a digital signal processor (DSP) or firmware/software-based system that mixes and/or switches audio/video signals received at its input ports under the control of conferencing server 12. The audio signals received at the conference server ports originate from each of the conference or meeting participants (e.g., individual conference participants using endpoint devices 14-16), and possibly from an interactive voice response (IVR) system (not shown). Conference server 12 may also incorporate or be associated with a natural language automatic speech recognition (ASR) module for interpreting and parsing speech of the participants, and standard speech-to-text (STT) and text-to-speech (TTS) converter modules.

Practitioners in the art will appreciate that the actual media paths are established by conferencing server 12. In other words, conferencing server 12 handles all of the control plane functions of the conference session, and is responsible for engaging the necessary media components/resources to satisfy the media requirements of each of the endpoints (i.e., endpoints 14-16) participating in a conference session. In operation, each of the endpoint devices shown in FIG. 2 may join an audio/video conference session by calling into a conferencing application running on conferencing server 12.

With continued reference to the embodiment of FIG. 1, IP PBX 13 may comprise a corporate intranet network/PBX packet-network (e.g., VoIP)-based system—such as Cisco's CallManager™ system with appropriate software modules, plug-ins, or enhancements for implementing the functions described herein. Alternative embodiments of the present invention may be implemented in software or hardware (firmware) installed in an IP communication systems, PBX, telephony, telephone, and other telecommunications systems. Similarly, the signaling path utilized for transmission of commands, messages, and signals for establishing, moderating, managing and controlling the conference session may be across any network resources.

Generally speaking, each of endpoint devices 14-16 represents an end user, client, or person who wishes to initiate or participate in a conference session and via conferencing server 12, as facilitated by IP PBX system 13. Various endpoint devices that may be used to initiate or participate in a conference session include a personal digital assistant (PDA), a laptop or notebook computer, a desktop personal computer (PC) with softphone capabilities, an IP telephone device, or any other device, component, element, or object capable of initiating or participating in voice, video, or data exchanges with conferencing server 12.

Figure 2:
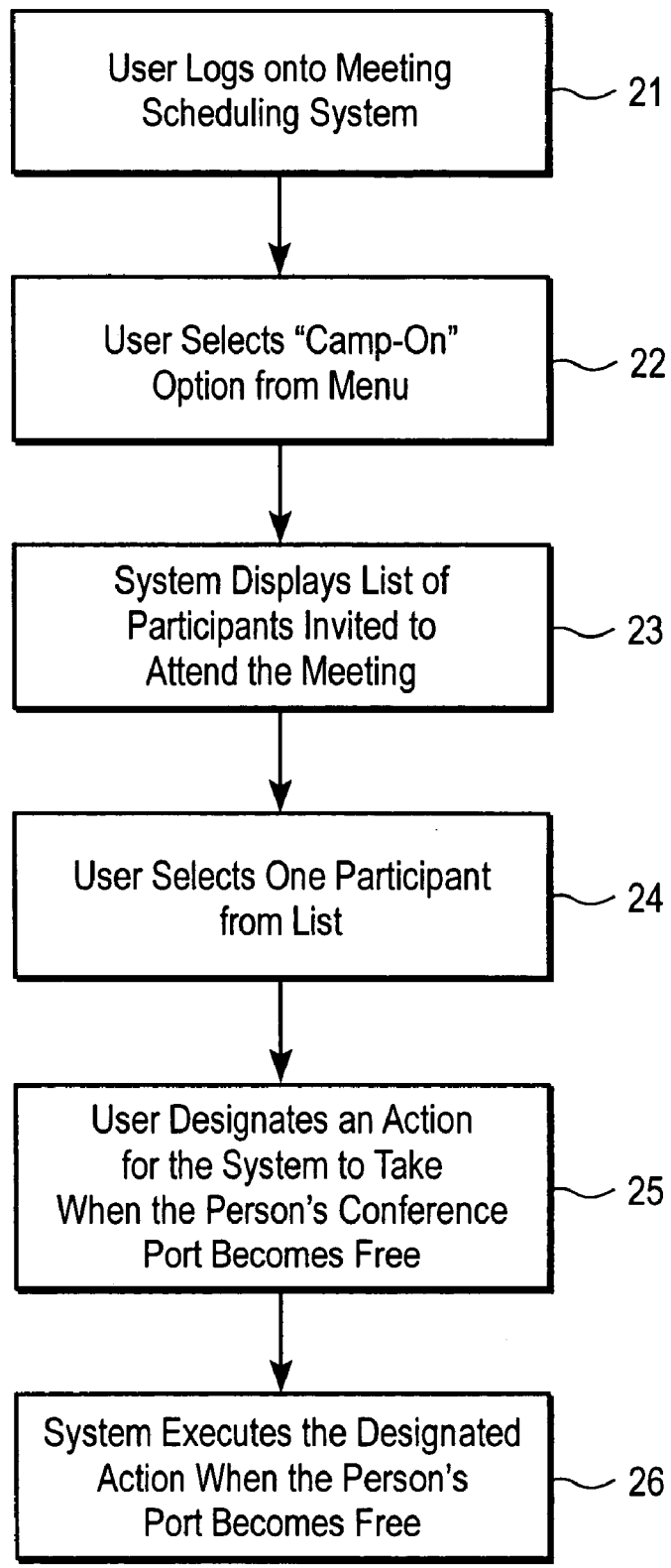
FIG. 2 illustrates an example method of camping on a conference participant's port.

FIG. 2 illustrates an example method of camping on a conference participant's port. In the method of FIG. 2, the user first logs onto the scheduling system to set up the camp-on for a particular attendee of a scheduled meeting (block 21). The user may select a camp-on option from an interactive menu—e.g., a graphical user interface (GUI) or a voice the scheduled meeting, and selects the camp-on option. For example, $EP_2$ (see FIG. 1) may comprise a PC with softphone capabilities and a GUI that allows a user to select (e.g., click on) an icon or button that invokes a routine for implementing the camp-on option. The GUI may be generated by software (i.e., code) running the user's PC. In other cases, the GUI may comprise a collaborative web-based application that is accessed by the browser software running on the user's PC. In other instances, GUI 13 may comprise a downloaded application, or other forms of computer-executable code that may be loaded or accessed by a participant's PC. For instance, the software code for implementing the GUI may be executed on IP PBX 13 and accessed by users who want to make a camp-on request.

Upon selecting the camp-on option, the system (i.e., conference server 12 and/or IP PBX 13) displays a list of participants that have been invited to attend the meeting or conference (block 22). The user may then select one participant from that list on whose conference port he wants to set the camp-on, i.e., the campee. If the person on whom the user wants to set the camp-on is missing from the list of participants, in one embodiment the user may optionally type in the email address or phone number of that person.

Figure 3:
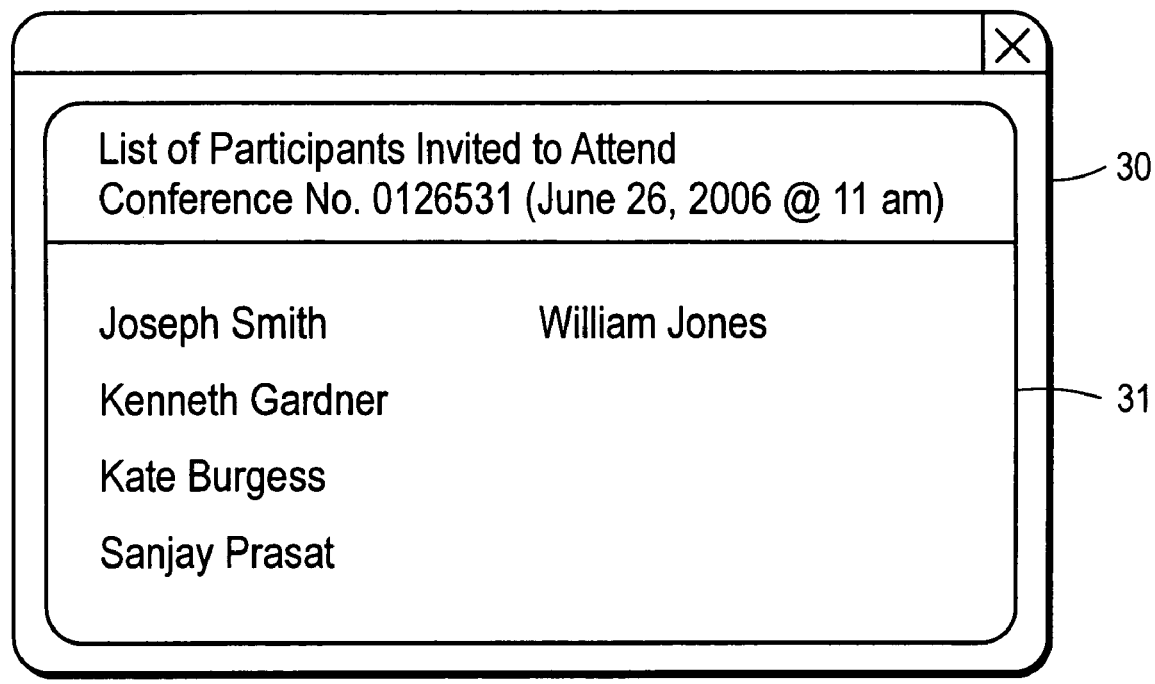
FIG. 3 illustrates an example graphical user interface (GUI).

FIG. 3 illustrates an example graphical user interface (GUI) 30 associated with an application running on a PC of and endpoint device according to a specific implementation. GUI 30 includes a window or field 31 that is shown populated with the names of five participants invited to attend conference number 0126531 (i.e., Joseph Smith, Kenneth Gardener, Kate Burgess, Sanjay Prasat and William Jones), which has been scheduled for a future date/time (Jun. 26, 2006 at 11:00 a.m.). At this point, the user may select a person from the list that he wants to camp-on (block 24 in FIG. 2) by clicking on that person's name in window 31.

Figure 4:
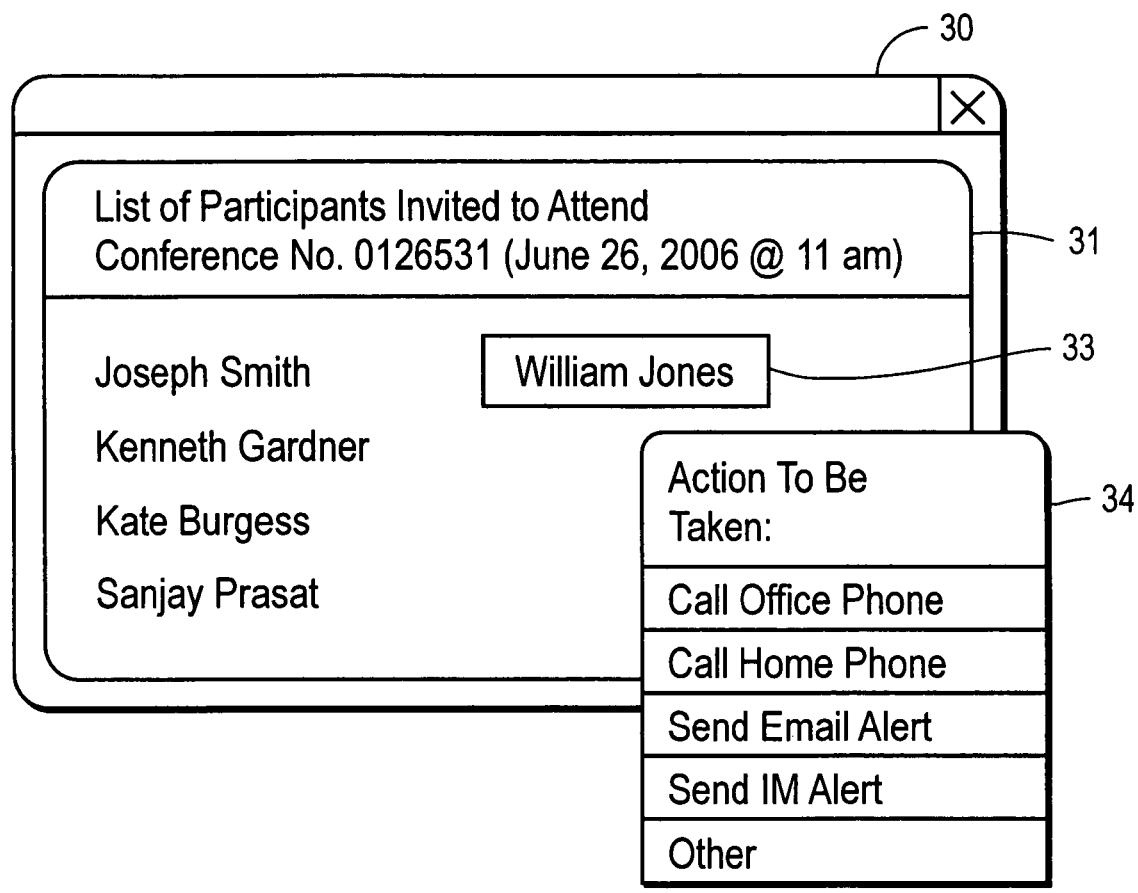
FIG. 4 illustrates example utilization of the user interface illustrated in FIG. 3 to select an action to be taken when a camped-on port becomes free.

FIG. 4 illustrates example utilization of the user interface illustrated in FIG. 3 to select an action to be taken when a camped-on port becomes free—in this case, to select a user (William Jones) as the campee. This selection is indicated in the GUI by the highlighted box 33 around William Jones' name. Upon making a camp-on request by selecting a participant's name, the GUI presents the user with an action selection window 34 that includes a list of possible actions that may take when the camped-on conference port becomes free. In the embodiment shown the actions include initiating a call from the user to the campee's office telephone number; initiating a call to the campee's home telephone number; sending an alert by email to the campee, instant messaging (IM), or providing the user with the option to specify another action to be taken. In this latter case, the user may optionally specify some other phone number (e.g., William Jones' cellphone) to call when the camped-on port becomes free. It is appreciated that a wide variety of other actions (not shown in FIG. 4) may also be specified or included in a listing for selection by a user. The step of designating an action for the system to take when the selected person's conference port becomes free is represented by block 25 in FIG. 2.

Note that in this example the camp-on request may be transmitted to IP PBX 13, which handles the request by communicating with server 12 to first identify which conference port William Jones is assigned to, and then to monitor that port in order to determine when that port becomes free (i.e., William Jones goes "off-hook" and leaves the conference session). When the camped-on conference port becomes free, IP PBX 13 responds by executing the designated action, i.e., as selected by the user (block 26). For instance in the example of FIG. 4, if the user selected the action "Call Office Phone" from the list in window 34 of FIG. 4 the IP PBX system would initiate an outbound call from the user to William Jones immediately after the camped-on conference port becomes free.

Figure 5:
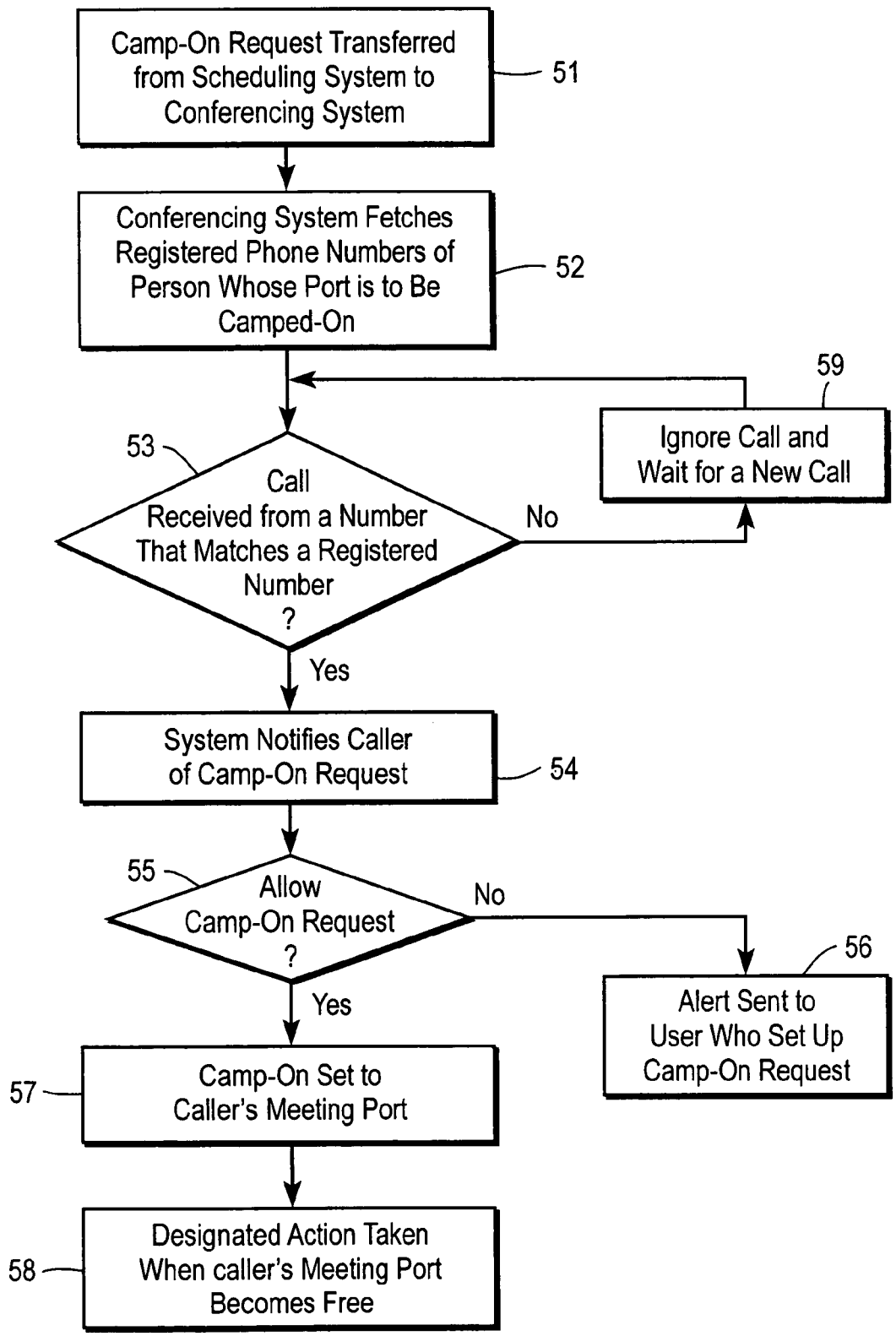
FIG. 5 illustrates an example method of identifying and camping-on a conference port in a configuration with separate conferencing and scheduling systems.

FIG. 5 illustrates an example method of identifying and camping-on a conference port in a configuration with separate conferencing and scheduling systems. The process begins after a participant (user) has set up a camp-on request by interacting with the scheduling system to select a particular attendee of a scheduled conference through the scheduling system. The user also has selected a particular action that he wants the system to take. At this point, the camp-on request of the user is transferred from the scheduling system to the conferencing system or server (block 51). The conferencing system responds by fetching from a corporate directory or database all of registered phone numbers of the campee (block 52).

Whenever someone dials into the scheduled conference session for which the camp-on has been set, the conferencing system or server attempts to match the telephone number of the incoming call to one of the stored telephone numbers registered to the person on whose port the camp-on has been requested (block 53). In the event of a match, the system notifies to the caller that a camp-on has been requested for his meeting port (block 54). If no match is found, the system simply waits for the next call, and repeats the matching process (block 59).

It is appreciated that the camp-on notification may take a number of different forms. For example, the conferencing system may send a "whisper" voice message to the participant when that person calls into the conference session. In other embodiments the notification may take the form of an instant message or email sent to the campee. The notification may also inform the participant of the name of the person who has requested the camp-on. After being notified of the camp-on request, the conferencing system may ask the campee whether he wants to permit or allow the camp-on, say, by pressing a certain DTMF keypad or sequence, or by otherwise providing an affirmative verbal response.

By way of further example, assume that a user by the name of Richard Morris has set up a camp-on request on William Jones' meeting port. When William calls into the conference, the conferencing system may notify him of the camp-on request by whispering, "Richard Morris has requested a camp-on to your meeting port. Please press '1' if you accept this camp-on request or press '2' to reject it". Practitioners will appreciate that this method of operation addresses situations wherein someone other than a registered user of a particular a phone number is actually using that phone to call into the conference session. For instance, if (for whatever reason) William Jones' co-worker, Holly, is using William's office phone to call into the conference session, she can deny the camp-on request. In the case where a caller declines a camp-on request, the conferencing system may send an alert (e.g., via email, IM, voice message, etc.) to the user who set up the camp-on request specifying that his camp-on request has been denied or rejected (block 56).

In the event that the camp-on request is approved (i.e., allowed) by the campee, the system sets the camp-on to monitor the participant's conference port (block 57), and then executes the user-specified action once the participant caller's conference or meeting port becomes free (block 58). In other words, when the camped-on port becomes free, the system executes the action requested by the user who set up the camp-on. In the above example, if Richard had asked the system to send an email alert when William's conference port becomes free, then the system responds accordingly. As another example, if Richard had requested that the system call William's cellphone from a telephone specified by Richard, then when William's conference port becomes free the system will utilize existing third party call control techniques to initiate a call from Richard's specified telephone number to William's cellphone.

In another embodiment, when the camped-on port becomes free, the system may first call the person whose port was camped-on to confirm that he is indeed available, so that the system can take the action requested by the user who had set the camp-on. For example, when William leaves the conference session, the system may calls him with an IVR menu prompt says, "Your call had been camped-on by Richard. Press 1 if you would like to be connected to Richard right now, press 2 if you got disconnected accidentally and are going back to the conference call, or press 3 if you want to deny the camp-on action requested by Joe." Note that this embodiment gives the campee a second chance at refusing or denying the camp-on action, and also accommodates situations where a participant's conference call was accidentally dropped. In this latter case, the system will not carry on Joe's requested camp-on action (such as connecting Richard's and William's telephones) but would rather camp-on William's port again when he re-dials back into the conference session.

In accordance with yet another embodiment, the scheduling system allows the user to specify an action to take in the event that the system is unable to camp-on to the conference port of the specified participant for a scheduled meeting. This embodiment, for example, is useful in situations when a conference invitee/participant for whom a camp-on request has been set fails to call into the conference session, or where for some reason he calls into the conference session from a phone that is not registered in his name (hence the system is unable to identify that person's conference port). In this embodiment, the user may optionally select a notification method and time when the system should notify him about the failure to camp-on to the specified person's meeting port. For example, Richard may specify that the system send him an email message 15 minutes into the meeting if the system has been unable to camp-on to William's conference port at that time.

In still another embodiment, the user may specify his preferred notification method for receiving camp-on denial alerts. In yet another embodiment, the system treats denial as failure to camp-on and sends the denial alert using the same notification method specified by the user for sending a failure to camp-on alert.

Figure 6:
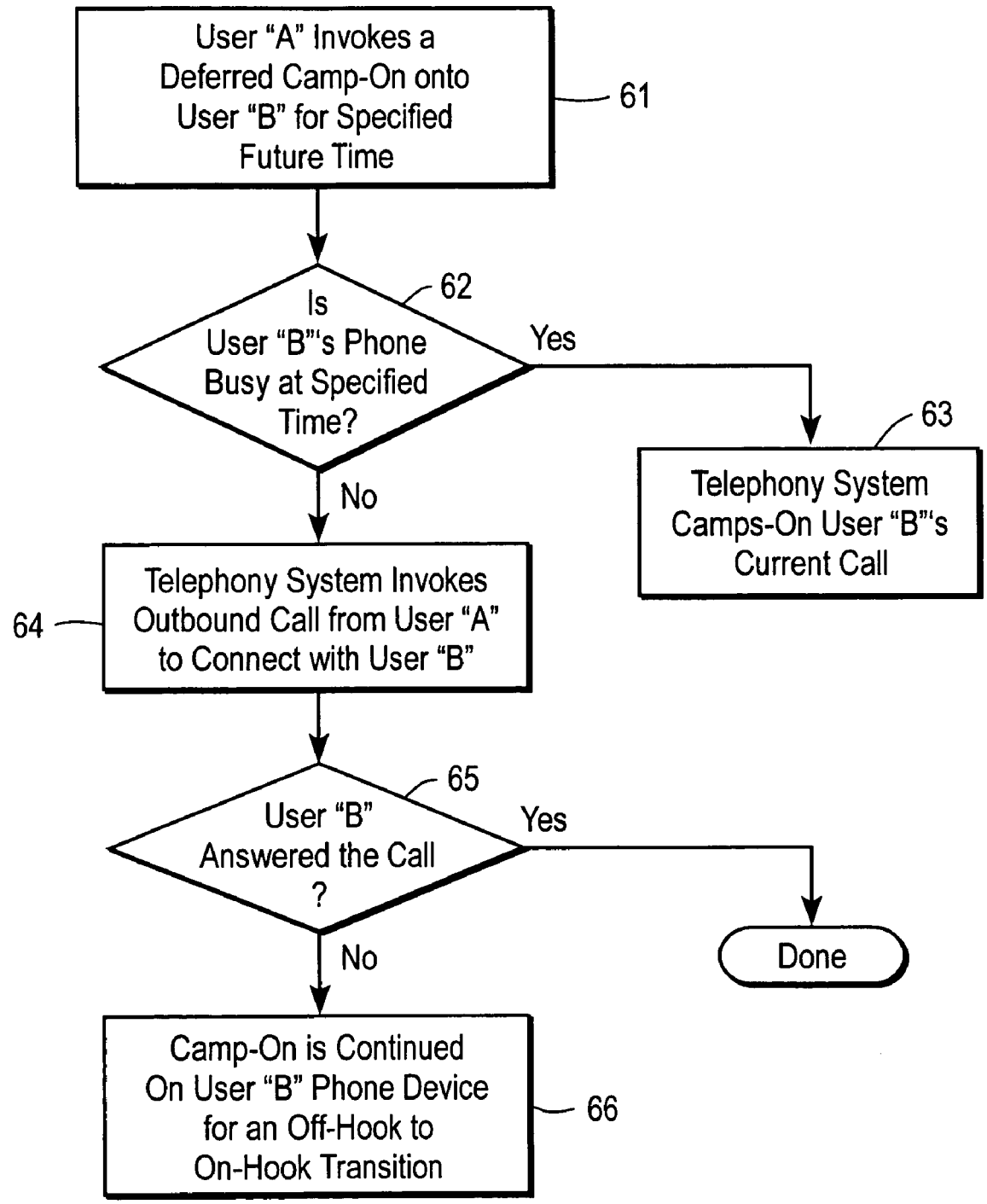

FIG. 6 illustrates an example method of operation for a deferred camp-on. This particular embodiment is useful in a scenario wherein a user "A" places a call to user "B" only to discover that user "B" is busy on another call. Rather than set-up an immediate camp-on on user "B", user "A" may want to reach user "B" at a future time, say, the next day at 1:00 p.m. User "A", however, notices (via a corporate scheduling or calendaring system) that user B has a conference call scheduled for that time.

According to the embodiment of FIG. 6, a telephony system gives user "A" the option to invoke a deferred camp-on onto user "B" for a future specified time. This act is represented in the flowchart of FIG. 6 by block 61. For example, in the example discussed above, user "A" may set a deferred camp-on for user "B" for the next day the next day (Friday) at 1:00 p.m. At 1:00 p.m. on Friday, the telephony system checks whether user "B's" telephone device is busy (block 62). If it is busy, the telephony system responds by camping-on his telephone device (block 63) so that when user "B" hangs up the current call, he will immediately be connected to user "A".

On the other hand, if at 1:00 p.m. on Friday the telephony system detects that user "B's" telephone device is free, the telephony system will invoke an outbound call from user "A" to connect with user "B" (block 64). If user "B" answers the call, the telephony system is done. However, if user "B" does not answer the call then the camp-on is continued on user "B's" telephone device until a future off-hook to on-hook transition (block 66). In other words, if user "B" is away from his desk or is unable to answer his phone at 1:00 p.m. on Friday, the telephony system will monitor user "B's" phone for a future time when user "B" hangs up on a call. At that point, the telephony system will again initiate or invoke an outbound call from user "A" to user "B". Practitioners in the art will appreciate that the step of invoking an outbound call to reach user "B" may be repeated multiple times, as predetermined by the telephony system or by certain preference settings of user "A".

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
    receiving, by an Internet Protocol Private Branch Exchange (IP-PBX) system, in advance of a scheduled conference session facilitated by the IP-PBX system, input from a user not invited to participate in the scheduled conference session transmitted via a user interface identifying a person, other than the user, invited to participate in the scheduled conference session, the input comprising a request to initiate a deferred camp-on to a conference port of the IP-PBX system associated with the person during the scheduled conference session;
    fetching, by the conferencing system, a set of registered telephone numbers of the person from a database;
    in response to an incoming call to the scheduled conference session from a telephone device having a certain number, attempting to match the certain number of the incoming call to one of the set of registered telephone numbers of the person;
    in the event of a match, camping-on the conference port of the incoming call and executing, by the IP-PBX system, a specified action in response to the conference port becoming free, the specified action including at least an attempt to establish communications between the person and the user; and
    in the event that there is no match after a predetermined time has elapsed following commencement of the scheduled conference session, notifying the user that the request to camp-on the conference port of the person has failed.

2. The computer-implemented method of claim 1 wherein the specified action comprises:
    initiating, by the IP-PBX system, a call from a first telephone device associated with the user to a second telephone device associated with the person.

3. The computer-implemented method of claim 1 further comprising:
    receiving, by the IP-PBX system, the specified action in advance of the scheduled conference session, the specified action being one of a plurality of actions presented to the user via the user interface.

4. A computer-implemented method of operation for a conferencing system comprising:
    receiving, by the conferencing system, input generated by a graphical user interface responsive to a request from a user in advance of a scheduled conference session hosted by a conference server, to initiate a deferred camp-on to a conference port of the conference server during the scheduled conference session, the conference port being associated with a person, other than the user, wherein the person is invited to attend the scheduled conference session, and the user is not invited to participate in the scheduled conference session;
    fetching, by the conferencing system, a set of registered telephone numbers of the person from a database;
    in response to an incoming call to the scheduled conference session from a telephone device having a certain number, attempting to match the certain number of the incoming call to one of the set of registered telephone numbers;
    in the event of a match:
        notifying, by the conferencing system, the person of the request when the person calls into the scheduled conference session through the conference port;
        prompting, by the conferencing system, the person either for an affirmative response to allow the request, or a negative response denying the request; and
        in the event of the affirmative response, camping-on the conference port of the incoming call and executing, by the conferencing system, a specified action when the conference port becoming free, the specified action including at least an attempt to establish communications between the person and the user; and
    in the event that there is no match after a predetermined time has elapsed following commencement of the scheduled conference session, notifying the user that the request to camp-on the conference port of the person has failed.

5. The computer-implemented method of claim 4 wherein the predetermined time is selectable.

6. The computer-implemented method of claim 4 wherein the specified action comprises:
    initiating, by an Internet Protocol Private Branch Exchange (IP-PBX), a call from a first telephone device associated with the user to a second telephone device associated with the person.

7. The computer-implemented method of claim 4 further comprising:
    receiving the specified action in advance of the scheduled conference session, the specified action being one of a plurality of actions presented to the user.

8. The computer-implemented method of claim 4 wherein the specified action comprises:
    sending, by the conferencing system, an email message from a first address associated with the user to a second address associated with the person.

9. The computer-implemented method of claim 4 further comprising, in the event of the negative response:
    alerting the user that the person has denied the request by the user.

10. A computer comprising:
    a memory comprising a computer program; and
    a processor operable to execute the computer program wherein when executed, the computer program is operable to:
    provide a user of a telephone with a list of persons invited to attend a scheduled conference session, wherein the user is not invited to participate in the scheduled conference session;
    receive a selection of a person, other than the user, from the list in advance of the scheduled conference session, the selection comprising a request to initiate a deferred camp-on to a conference port of the person during the scheduled conference session, the person communicating with the scheduled conference session through the conference port;

receive a selection of an action, from a list of executable actions, in response to the person leaving the scheduled conference session and the conference port becoming free, wherein the action includes at least an attempt to communicate with the person by the user;

fetch a set of registered telephone numbers of the person from a database;

in response to an incoming call to the scheduled conference session from a certain number, attempt to match the certain number of the incoming call to one of the set of registered telephone numbers;

in the event of a match, camp-on the conference port of the incoming call and execute the selected executable action; and in the event that there is no match after a predetermined time has elapsed following the commencement of the scheduled conference session, notify the user that the request to camp-on the conference port of the person has failed.

11. The computer of claim 10 wherein the action comprises an outbound call placed from a first telephone device associated with the user to a second telephone device associated with the person.

12. The computer of claim 10 wherein the action comprises a message sent from the user to the person.

13. The computer of claim 12 wherein the message comprises an instant message.

14. The computer of claim 12 wherein the message comprises an email message.

15. A non-transitory computer-readable memory encoded with a computer program, when executed on an electronic device, operable to:

prior to a conference session, set up a deferred camp-on to a conference port associated with a person invited to attend the conference session in response to one or more selection input received from a user not invited to participate in the conference session through a user interface, the one or more selection input including a name of the person and a specified action to be taken when the person leaves the conference session, the specified action including at least an attempt to establish electronic communications between the person and a user of the user interface;

fetch, by the conferencing system, a set of registered telephone numbers of the person from a database;

in response to an incoming call to the scheduled conference session from a telephone device having a certain number, attempt to match the certain number of the incoming call to one of the set of registered telephone numbers;

in the event of a match, camp-on a conference port of the person, the person communicating with the conference session via the conference port, and when the conference port becomes free as a result of the person leaves the conference session, execute the specified action; and in the event that there is no match after a predetermined time has elapsed following commencement of the scheduled conference session, notify the user that the request to camp-on the conference port of the person has failed.

16. The non-transitory computer-readable memory of claim 15 wherein the user interface comprises a graphical user interface.

17. The non-transitory computer-readable memory of claim 15 wherein the computer program, when executed, is further operable to:

notify the person of the camp-on request when the person calls into the conference session;

provide the person with an option of allowing or denying the camp-on request, wherein the specified action is executed only if the person allows the camp-on request.

18. The non-transitory computer-readable memory of claim 15 wherein the specified action comprises initiating an outbound call from a first telephone device associated with the user to a second telephone device associated with the person.

* * * * *